(12) United States Patent
Shieh

(10) Patent No.: US 7,560,526 B2
(45) Date of Patent: Jul. 14, 2009

(54) POLYOL WITH HIGH CYCLOPENTANE SOLUBILITY

(75) Inventor: David J. Shieh, Sugarland, TX (US)

(73) Assignee: Oxid, L.P., Houston, TX (US)

( * ) Notice: Subject to any disclaimer, the term of this patent is extended or adjusted under 35 U.S.C. 154(b) by 0 days.

(21) Appl. No.: 11/725,991

(22) Filed: Mar. 20, 2007

(65) Prior Publication Data

US 2007/0225392 A1   Sep. 27, 2007

Related U.S. Application Data

(60) Provisional application No. 60/784,411, filed on Mar. 21, 2006.

(51) Int. Cl.
 C08G 63/48 (2006.01)
 C08G 63/00 (2006.01)
 C08G 67/00 (2006.01)
 C08G 69/00 (2006.01)
 C08G 63/02 (2006.01)

(52) U.S. Cl. .................... 528/295.5; 528/271; 528/272

(58) Field of Classification Search ................ 521/114, 521/172; 528/295.5, 271, 272
See application file for complete search history.

(56) References Cited

U.S. PATENT DOCUMENTS 4,644,048 A   2/1987 Magnus et al.
6,133,329 A   10/2000 Shieh et al.
6,359,022 B1   3/2002 Hickey et al.
6,664,363 B1 *   12/2003 Faunce .................... 528/295.5

* cited by examiner

Primary Examiner—James Seidleck
Assistant Examiner—Melissa Winkler
(74) Attorney, Agent, or Firm—Howrey LLP

(57) ABSTRACT

Methods and compositions for forming polyurethane foam. A method for manufacturing an aromatic polyester polyol comprises heating a glycol, a dicarboxylic acid or ester, functionality enhancing agent, and a natural oil to about 480° F. to form a reaction product, allowing the reaction product to cool to about 140° F., and adding additional glycol to form an aromatic polyester polyol composition, wherein the total glycol comprises less than about 36 weight percent of the polyol composition. An aromatic polyester polyol composition comprises a glycol, a dicarboxylic acid or ester, functionality enhancing agent, and a natural oil, wherein the total glycol comprises less than about 36 weight percent of the aromatic polyester polyol composition. An aromatic polyester polyol composition comprising a cyclopentane solubility of at least about 25 percent, a hydroxyl number of at least about 150, the natural oil comprising less than about 25 weight percent, and/or the dicarboxylic acid or ester comprising more than about 29 weight percent of the polyol composition.

20 Claims, No Drawings

POLYOL WITH HIGH CYCLOPENTANE SOLUBILITY

The present application claims priority benefit to U.S. Provisional Application Ser. No. 60/784,411 filed Mar. 21, 2006, the entire contents of which are incorporated by reference herein.

FIELD OF THE INVENTION

Technical Field

This invention is related to the field of polyurethane foam manufacturing, specifically making polyeurethane foam using aromatic polyester polyols, and more specifically, using aromatic polyester polyols made from glycols, dicarboxylic acids or dicarboxylic esters, functionality enhancers, and natural oils.

BACKGROUND OF THE INVENTION

Foam producers use aromatic polyester polyols along with other ingredients to produce polyurethane foams. Other ingredients may include polyether polyols, silicone surfactants, various amine or metal catalysts and blowing agents. This type of blend is called "system blend" or "polyol blend." The polyol blend is one of two important components for making polyurethane foam. The other important component is isocyanate. Another important ingredient is a blowing agent. Without a blowing agent, it is impossible to make low-density cellular plastics with very high strength to weight ratio. Suitable blowing agents are hydro fluorocarbons (HFC), hydrocarbons, especially the pentane isomers, and water (carbon dioxide).

Water reacts with isocyanate to form an unstable carbamic acid, which decomposes to form an amine and carbon dioxide. The amine immediately reacts with additional isocyanate to form a substituted urea. The potential problems of employing water as a blowing agent are numerous. Urea would cause polyurethane foam to be brittle and friable, which deteriorates the adhesion of foam to a substrate. Carbon dioxide has higher permeability than air through the polyurethane cell window that could cause low-density polyurethane foam to shrink. One mole of water would react with two moles of isocyanate and release one mole of carbon dioxide. It is not a very economical way of obtaining blowing agents since isocyanate is an expensive component. Carbon dioxide is a gas with higher thermal conductivity than hydrofluorocarbons (HFC) and hydrocarbons. Water can not reduce the viscosity of "polyol blend" since it generally is not very soluble in most common polyethers or polyesters.

The most common HFCs in North America are: HFC245fa and HFC134a. Both are popular physical blowing agents. The disadvantages of employing HFCs are varied. Because they have a boiling point below room temp, they need a pressure rated vessel to hold the "polyol blend," special caution would be needed when handling the "polyol blend" that contains HFC245fa in hot weather since its boiling point is 15.3 degrees C. Water is needed to replace some of the HFC245fa in the "polyol blend" to alleviate the vapor pressure in drums. However, some the physical properties of foam would be compromised if too much water is used in the "polyol blend." Compared to water and hydrocarbons, HFC245fa is an expensive blowing agent.

As to hydrocarbons, the most popular are isomers of pentane. In the PUR/PIR foams markets, there are three isomers of pentanes being used. Lamination employs a blend of normal pentane and isopentane. The ratio varies from 0.2/0.8 to 0.8/0.2. System houses use 95 percent cyclo pentane and blends of cyclo/iso pentane in ratios varying from 20/80 to 50/50 for both spray application and pour in place (PIP) systems.

The advantages of employing cyclo pentane include the following. It is cheap and abundant, and has a boiling point of 49° C. There is no problem due to vapor pressure of "polyol blend" that contains cyclo pentane or cyclo/iso blends in the containers. Also, the thermal conductivity of cyclopetane is better than that of carbon dioxide.

The disadvantages of employing cyclo pentane include the following. It is a flammable liquid, and special handling is needed. It is not very compatible with most current aromatic polyester polyols, which have high hydroxyl number and high functionality. It reduces the water solubility of "polyol blend".

When comparing all three blowing agents, the cyclo pentane and cyclo/iso pentane blends are the strongest candidate for polyurethane system applications.

Reacting a natural oil with polyethylene terephthalate in a solution at about 450° F. has been discussed in U.S. Pat. No. 6,133,329, which is incorporated by reference in its entirety herein. Pentane solubility can be increased by using hydrophobes and high molecular weight glycols in the polyester polyol formulations. However, as is shown by Example 5 of U.S. Pat. No. 6,133,329, the improvement in pentane solubility was marginal. The composition of the polyol is listed below.

| Weight % | Ingredients |
|---|---|
| 25.95 | Diethylene Glycol |
| 12.44 | Triethylene Glycol |
| 5.7 | Tetraethylene Glycol |
| 30.7 | Terephthalate |
| 4.68 | Pentaerythritol |
| 20.54 | Corn Oil |

The physical properties and pentane solubilities are listed below.

| | |
|---|---|
| Hydroxyl number | 220 |
| Viscosity at 25 degrees C. | 3,500 cps |
| Percent normal pentane solubility | 15.25 |
| Percent iso pentane solubility | 16.67 |
| Percent cyclo pentane solubility | 20 |

Although there is an improvement in pentane solubility by combining high molecular weight glycols and corn oil, the benefit comes at very high cost because heavy glycols are much more expensive than corn oil. Polyester polyols made this way are not commercially feasible in today's market.

As discussed in U.S. Pat. No. 6,133,329, pentane solubility can also be increased by reducing the hydroxyl number of polyol. However, adding an additional 160 OH NO polyol showed limited improvement. The compositions of 160-hydroxyl number polyol are as follows.

| Weight % | Ingredients |
|---|---|
| 12.38 | Diethylene Glycol |
| 22.24 | Triethylene Glycol |

-continued

| Weight % | Ingredients |
|---|---|
| 17.12 | Tetraethylene Glycol |
| 27.76 | Terephthalate |
| 20.5 | Corn Oil |

The physical properties and pentane solubilities are listed below.

| | |
|---|---|
| Hydroxyl number | 160 |
| Viscosity @ 25 degrees C. | 1,800 cps |
| Percent cyclo pentane solubility | 19.5 |

Commercially available polyester polyols have some pentane solubility, but higher solubility is needed. The commercially available polyols have 5 to 20 percent cyclo pentane solubility. This solubility is not sufficient to make commercially acceptable low density polyurethane foam because as more pentane is added to the polyols, pentane separation occurs. To combat pentane separation, emulsifiers may be added, but emulsifiers lack long term stability and are dependent on many factors. A polyester polyol for low density polyurethane foam applications with at least 25 percent pentane solubility is desirable because it will yield a clear and soluble "polyol blend." Also, tailored reaction conditions are needed to provide different levels of pentane solubility with the addition of a comparable amount of hydrophobe to a polyester polyol.

SUMMARY

The present invention provides methods and compositions for forming polyurethane foam. Polyurethane foams are formed by combining the compositions described herein with an isocyante and a blowing agent. In one embodiment, a method for manufacturing an aromatic polyester polyol comprises heating a glycol, a dicarboxylic acid or ester, functionality enhancing agent, and a natural oil to about 480° F., to form a reaction product, allowing the reaction product to cool to about 140° F., and adding additional glycol to form an aromatic polyester polyol composition, wherein the total glycol comprises less than about 36 weight percent of the polyol composition. In one embodiment, an aromatic polyester polyol composition comprises a glycol, a dicarboxylic acid or ester, functionality enhancing agent, and a natural oil, wherein the total glycol comprises less than about 36 weight percent of the aromatic polyester polyol composition. In another embodiment, the aromatic polyester polyol composition comprises a cyclopentane solubility of at least about 25 percent, a hydroxyl number of at least about 150, the natural oil comprising less than about 25 weight percent, and/or the dicarboxylic acid or ester comprising more than about 29 weight percent of the polyol composition. In an aspect, the aromatic polyester polyol composition have an aromatic acid content of about 30 to about 40 weight percent.

DETAILED DESCRIPTION OF THE PREFERRED EMBODIMENT

Obtaining a 25 percent or higher pentane soluble polyester polyol can be achieved by combining glycols, dicarboxylic acids or dicarboxylic esters, functionality enhancers, and natural oils. The glycols that may be selected include diethylene glycol, triethylene glycol, and tetraethylene glycol. The dicarboxylic acids and dicarboxylic esters that may be selected include terephthalic acid (TPA), phthalic anhydride, polyethylene terephthalate (PET), and a byproduct of aromatic carboxylic acid (BACA). Functionality enhancers include sorbitol, pentaerythritol, corpent, and glycerin. Natural oils include corn oil, soybean oil, coconut oil, cottonseed oil, linseed oil, olive oil, palm oil, palm kernel oil, peanut oil, sunflower oil, tall oil, tallow, and mixtures thereof.

To combine these components, the glycol, dicarboxylic acid or ester, functionality enhancer, and oil are combined using a standard esterification process in a reactor with agitation, reflux condenser, separation column, overhead receiver, and a thermocouple. The reaction mixture is heated to about 480° F. with constant circulation and vacuum pressure at 250 mm Hg. As the mixture heats from 450° F. to 480° F., a catalyst, such as Tyzor TE™ (a triethanolamine titanate chelate commercially available from DuPont Corporation of Wilmington, Del.) was added to increase the reaction rate. At about 480° F., the theoretical amount of water and ethylene glycol present in the blend is distilled from the reaction mixture. The diethylene glycol could also be removed at this temperature. Then, as the reaction cools to about 140° F., additional diethylene glycol is added to the reaction.

The following examples are included to demonstrate certain preferred embodiments of the invention for extra guidance purposes. As such, these examples should not be construed to limit the invention in any manner.

EXAMPLES

Comparative Example 1

1,674 grams of diethylene glycol, 436 grams of phthalic anhydride, 1,222 grams of terephthalic acid, 275 grams of 70 percent sorbitol and 772 grams of corn oil were added to a five liter glass pot that was equipped with an agitator, reflux condenser, separation column, overhead receiver, and a thermocouple. The reaction mixture was heated to about 480° F. with constant agitation and vacuum pressure @ 250 mm Hg. At about 450° F., 4 grams of Tyzor TE™ were added to the reaction mixture and the reactive distillation process continued until the theoretical amount of water was distilled from the reaction mixture.

The resulting polyester polyol was characterized by determining hydroxyl number, acid number, viscosity, and pentane solubility. The polyol produced according to the above method had the following properties.

| | |
|---|---|
| Hydroxyl number | 209 |
| Acid number | 0.90 |
| Viscosity @ 77 degree F. | 4,720 cps |
| Cyclo pentane solubility | 11%. |

The percent corn oil in finished polyol was 19.3. This polyol was designed to have hydroxyl number of 213. There was not much diethylene glycol lost during the reaction.

Comparative Example 1-A

A pilot scale reaction was conducted in the 1,000 gallon pilot reactor. We first added 3,259 pounds of diethylene glycol, 900 pounds of phthalic anhydride, 2,437 pounds of terephthalic acid, 566 pounds of 70 percent sorbitol and 1,594 pounds of corn oil to the pilot reactor that was equipped a circulation pump, reflux condenser, separation column, overhead receiver and a thermocouple.

The reaction mixture was heated to about 480° F. with constant circulation and vacuum pressure @ 250 mm Hg. At about 450° F., research added 8 pounds of Tyzor TE™ was added to the reaction mixture. The reactive distillation process was continued until the theoretical amount water was distilled from the reaction mixture.

The resulting polyester polyol was characterized by determining hydroxyl number, acid number, viscosity and pentane solubility. The polyol produced according to the above method had the following properties.

| | |
|---|---|
| Hydroxyl number | 202 |
| Acid number | 1.20 |
| Viscosity @ 77 degree F. | 5,040 cps |
| Cyclo pentane solubility | 10.9%. |

The theoretical hydroxyl number of this polyol was 205, indicating no diethylene glycol was removed during manufacturing of the polyol. The percent corn oil in finish polyol was about 19.3 percent based on formulation.

Comparative Example 1-B

Another polyol was made in a 10,000 gallon reactor. 20,899 pounds of diethylene glycol, 9 pounds of triethylene glycol, 9 pounds of tetraethylene glycol, 5,604 pounds of phthalic anhydride, 15,750 pounds of terephthalic acid, 3,592 pounds of 70 percent sorbitol and 9,729 pounds of corn oil were added to the reactor that was equipped an agitation system, reflux condenser, separation column, overhead receiver and a thermocouple. The reaction mixture was heated to about 480° F. with constant circulation and vacuum pressure at 250 mm Hg. At about 450° F. we added 50 pounds of Tyzor TE™ to the reaction mixture. The reactive distillation process continued until the theoretical amount water was distilled from the reaction mixture.

The resulting polyester polyol was characterized by determined hydroxyl number, acid number, viscosity and pentane solubility. The polyol produced according to the above method had the following properties.

| | |
|---|---|
| Hydroxyl number | 200; |
| Acid number | 1.50; |
| Viscosity @ 77 degree F. | 4,800 cps; |
| Cyclo pentane solubility | 10.9%. |

The theoretical OH NO of this polyol was 200; thus, no diethylene glycol was removed during the process. The percent corn oil in finished polyol was 19.3 percent.

Example 2

Example 1-A was repeated in the 1,000 gallon pilot reactor. We added 1,831 pounds of diethylene glycol, 545 pounds of phthalic anhydride, 1,334 pounds of terephthalic acid, 343 pounds of 70 percent sorbitol and 966 pounds of corn oil to pilot reactor that was equipped a circulation pump, reflux condenser, separation column, overhead receiver, and a thermocouple. The reaction mixture was heated to about 480° F. with constant circulation and vacuum pressure @ 250 mm Hg. At about 450° F., we added 5 pounds of Tyzor TE™ to the reaction mixture and continued the reactive distillation process until the theoretical amount water was distilled from the reaction mixture.

During the reaction, due to a mechanical problem, we experienced the loss of diethylene glycol from reaction mixtures that were held at high temperature for several days. At the end of reaction, the polyol had a hydroxyl number of 161 and viscosity of 11,000 , this polyol should have had an OH NO of 200 and a viscosity of 5000 cps. The discrepancy was due to heavy losses of diethylene glycol. The hydroxyl number was then adjusted to 200 by adding diethylene glycol at 140° F.

The following properties after adjustment follow.

| | |
|---|---|
| Hydroxyl number | 202 |
| Acid number | 1.20 |
| Viscosity @ 77 degree F. | 4,650 cps |
| Cyclo pentane solubility | 22.5 percent |

The percent corn oil in finished polyol was 19.3 percent based on formulation.

Example 3

We charged 4,000 grams of finish polyol from Example 1-B to a 4-neck 5 liter flask that was equipped with reflux condenser, separation column, overhead receiver and a thermocouple. The reaction mixture was heated to 460° F. with 100 mm Hg vacuum. Total of 213 grams of diethylene glycol were removed from reaction mixture. The resulting polyester polyol was characterized by determining hydroxyl number, acid number, viscosity. The polyol had the following properties.

| | |
|---|---|
| Hydroxyl number | 152 |
| Viscosity @ 77° F. | 14,240 cps |

The hydroxyl number of this polyol was raised up to 197 by adding diethylene glycol at 140° F. The viscosity and solubility of polyol were characterized as follows.

| | |
|---|---|
| Viscosity @ 77 degree F. | 7,520 cps |
| Cyclo pentane solubility | 30.56 percent |

The percent corn oil in finished polyol was 19.3 percent.

Comparative Example 4

Example 1-A was repeated except that soybean oil was used to replace corn oil in the formulation. A pilot scale reaction was conducted in the 1,000 gallon pilot reactor. Initially, 4669 pounds of diethylene glycol, 1390 pounds of phthalic anhydride, 3402 pounds of terephthalic acid, 875 pounds of 70 percent sorbitol and 2463 pounds of soybean oil were added to a pilot reactor that was equipped a circulation pump, reflux condenser, separation column, overhead receiver, and a thermocouple. The reaction mixture was heated to about 480° F. with constant circulation and vacuum pressure at 250 mm Hg. At about 450° F. we added 8 pounds of Tyzor TE™ to the reaction mixture and continued the reactive distillation process until the theoretical amount of water was distilled from the reaction mixture.

The resulting polyester polyol was characterized by determining hydroxyl number, acid number, viscosity, and pentane solubility. The polyol produced according to the above method had the following properties.

| Hydroxyl number | 195 |
|---|---|
| Acid number | 1.20 |
| Viscosity @ 77 degree F. | 4,700 cps |
| Cyclo pentane solubility | 16.7 percent |

The percent soybean oil in finished polyol was 19.3 percent based on the formulation.

Example 5

4,000 grams of finish polyol from Example 4 was charged into a 4-neck 5 liter flask that was equipped with reflux condenser, separation column, overhead receiver, and a thermocouple. The reaction mixture was heated up to 460° F. with 100 mm Hg vacuum. A total of 400 grams of diethylene glycol was removed from reaction mixture. The resulting polyester polyol was characterized by determining hydroxyl number, acid number, and viscosity. The polyol had the following properties.

| Hydroxyl number | 100 |
|---|---|
| Viscosity at 77° F. | 23,280 cps |

The hydroxyl number of this polyol was raised up to 195 by adding diethylene glycol at 140° F. The viscosity and solubility of polyol were characterized as follows.

| Viscosity @ 77° F. | 7120 cps |
|---|---|
| Cyclo pentane solubility | 32.43 percent |

The percent soybean oil in finished polyol was still 19.3 percent. This shows that the same technique could apply to soybean oil.

Comparative Example 6

1,630 grams of diethylene glycol and 1,409 grams of polyethylene terephthalate (PET) were added to a five liter glass pot that was equipped with an agitator, reflux condenser, separation column, overhead receiver, and a thermocouple. The reaction mixture was heated to about 450° F. with constant agitation. The reaction mixtures were held at 450° F. for no less than 2 hours. The pot was then cooled. At 200° F. we charged 446 grams of 70 percent sorbitol, 168 grams of 80 percent corpent (byproduct from the manufacturing pentaerythritol), 418 grams of phthalic anhydride, and 832 grams of corn oil to the pot. The reaction mixture was heated to about 460° F. with constant circulation and vacuum pressure at 150 mm Hg. At about 450° F. we added 4 grams of Tyzor TE™ to the reaction mixture and continued the reactive distillation process until the theoretical amount water and ethylene glycol were distilled from the reaction mixture. The theoretical hydroxyl number was 261.

The resulting polyester polyol was characterized by determining hydroxyl number, acid number, viscosity, and pentane solubility. The polyol produced according to the above method had the following properties.

| Hydroxyl number | 262 |
|---|---|
| Acid number | 0.50 |
| Viscosity @ 77° F. | 11,520 cps |
| Cyclo pentane solubility | 16 percent |

The corn oil in the polyol was 19.57 percent.

Example 7

We added 4,000 grams of polyol from example 6 to a pot. The pot was heated to 460° F. with 100 mm Hg vacuum and with very little reflux. A total 10 percent diethylene glycol was removed based on the initial charged weight. The resulting polyol had the following properties.

| Hydroxyl number | 141 |
|---|---|
| Viscosity @ 77° F. | >80,000 cps |

The hydroxyl number of this polyol was raised up to original value (262) by adding diethylene glycol at 140° F. The viscosity and solubility of polyol were characterized as follows.

| Viscosity @ 77° F. | 20,400 cps |
|---|---|
| Cyclo pentane solubility | 31 percent |

The corn oil in the polyol was 19.57 percent.

Example 8

931 grams of diethylene glycol, 394 grams of phthalic anhydride, 1,326 grams of terephthalic acid, 468 grams of 70 percent sorbitol, 445 grams of glycerin, and 890 grams of corn oil were added to a five liter glass pot that were equipped with an agitator, reflux condenser, separation column, overhead receiver, and a thermocouple. The reaction mixture was heated to about 480° F. with constant agitation and vacuum pressure at 250 mm Hg. At about 450° F. we added 4 grams of Tyzor TE™ to the reaction mixture and continued the reactive distillation process until the theoretical amount of water was distilled from the reaction mixture. The theoretical hydroxyl number of this polyol was 252.

The resulting polyester polyol was characterized by determining hydroxyl number, acid number, viscosity, and pentane solubility. The polyol produced according to the above method had the following properties.

| Hydroxyl number | 221 |
|---|---|
| Acid number | 0.80 |
| Viscosity at 77° F. | >80,000 cps |

The hydroxyl numbers of this polyol was raised to 335, 350, 375, and 400 by adding incremental amounts of diethylene glycol respectively. The following table displayed the percent cyclo pentane solubilities at different hydroxyl numbers.

| Hydroxyl Number | % Corn Oil in Finish Polyol | Viscosity at 77 degree F. | % Cyclo pentane solubility |
|---|---|---|---|
| 335 | 19.96 | 12,720 | 36.7 |
| 350 | 19.54 | 10,800 | 35.1 |
| 375 | 18.85 | 6,880 | 32.4 |
| 400 | 18.16 | 5260 | 29.6 |

Example 9

1,268 grams of diethylene glycol and 1,484 grams of polyethylene terephthalate (PET) were added to a five liter glass pot that was equipped with an agitator, reflux condenser, separation column, overhead receiver, and a thermocouple. The reaction mixture was heated to about 450 ÿ F with constant agitation. The reaction mixtures were held at 450 ÿ F for no less than 2 hours. The pot was then cooled down. At 200 ÿ F we charged 419 grams of 70percent sorbitol, 528 grams of 80 percent corpent (byproduct of manufacturing pentaerythritol), 440 grams of phthalic anhydride and 854 grams of corn oil to the pot. The reaction mixture was heated to about 460 ÿ F with constant circulation and vacuum pressure at 150 mm Hg. At about 450 ÿ F we added 4 grams of Tyzor TE™ to the reaction mixture and continued the reactive distillation process until the theoretical amount water and ethylene glycol were distilled from the reaction mixture. The theoretical hydroxyl number was 225.

The resulting polyester polyol was characterized by determining hydroxyl number, acid number, viscosity and pentane solubility. The polyol produced according to the above method had the following properties.

| Hydroxyl number | 225 |
|---|---|
| Acid number | 0.90 |
| Viscosity at 77° F. | >80,000 cps |

The hydroxyl number of this polyol was raised to 300, 330, and 350 by adding diethylene glycol at 140° F. The following table displayed the percent cyclo pentane solubilities at different hydroxyl numbers.

| Hydroxyl Number | % Corn Oil in Finish Polyol | Viscosity @ 77 degree F. | % Cyclo pentane solubility |
|---|---|---|---|
| 300 | 18.34 | 11,840 | 34.2 |
| 330 | 17.61 | 7,840 | 33.3 |
| 350 | 17.13 | 5,960 | 30.6 |

Example 10

881 grams of diethylene glycol, 463 grams of glycerin, and 2,042 grams of polyethylene terephthalate (PET) were added to a five liter glass pot that was equipped with an agitator, reflux condenser, separation column, overhead receiver, and a thermocouple. The reaction mixture was heated to about 450° F. with constant agitation. The reaction mixtures were held at 450° F. for no less than 2 hours. The pot was then cooled down to 200° F. We then charged 486 grams of 70 percent sorbitol and 912 grams of corn oil to the pot. The reaction mixture was heated to about 460° F. with constant circulation and vacuum pressure at 150 mm Hg. At about 450° F., we added 4 grams of Tyzor TE™ to the reaction mixture and continued the reactive distillation process until the theoretical amount water and ethylene glycol were distilled from the reaction mixture. The theoretical hydroxyl number was 251.

The resulting polyester polyol was characterized by determining hydroxyl number, acid number, viscosity and pentane solubility. The polyol produced according to the above method had the following properties.

| Hydroxyl number | 234 |
|---|---|
| Viscosity at 77° F. | >80,000 cps |

The hydroxyl number of this was raised to 335, 350, 375, and 400 by adding diethylene glycol respectively at 140° F. The following table displays the percent cyclo pentane solubilities at different hydroxyl numbers.

| Hydroxyl Number | % Corn Oil in Finish Polyol | Viscosity @ 77 degree F. | % Cyclo pentane solubility |
|---|---|---|---|
| 335 | 20.44 | 15,520 | 37.5 |
| 350 | 20 | 12,560 | 36.3 |
| 375 | 19.31 | 8,560 | 34.2 |
| 400 | 18.61 | 6.080 | 31.5 |

Example 11

716 grams of diethylene glycol, 691 grams of glycerin and 2,162 grams of polyethylene terephthalate (PET) were added to a five liter glass pot that was equipped with an agitator, reflux condenser, separation column, overhead receiver, and a thermocouple.

The reaction mixture was heated to about 450° F. with constant agitation. The reaction mixture was held at 450° F. for no less than 2 hours. The pot was then cooled down to 200° F. and charged with 439 grams of 70 percent sorbitol and 800 grams of corn oil. The reaction mixture was heated to about 460° F. with constant circulation and vacuum pressure at 150 mm Hg. At about 450° F., we added 4 grams of Tyzor TE™ to the reaction mixture and continued the reactive distillation process until the theoretical amount water and ethylene glycol were distilled from the reaction mixture. The theoretical hydroxyl number was 284.

The resulting polyester polyol was characterized by determining hydroxyl number, acid number, viscosity, and pentane solubility. The polyol produced according to the above method had the following properties.

| Hydroxyl number | 281 |
|---|---|
| Acid number | 0.8 |
| Viscosity at 77° F. | >80,000 cps |

The hydroxyl numbers of this were raised up to 400 and 450 by adding diethylene glycol respectively at 140° F. The following were the viscosity and cyclo pentane solubility of polyol after adjustment.

| Hydroxyl Number | % Corn Oil in Finish Polyol | Viscosity @ 77 degree F. | % Cyclo pentane solubility |
|---|---|---|---|
| 400 | 17.01 | 17,400 | 38.27 |
| 450 | 15.72 | 8,000 | 34.40 |

Example 12

1,062 grams of diethylene glycol and 2,047 grams of polyethylene terephthalate (PET) were added to a five liter glass pot that was equipped with an agitator, reflux condenser, separation column, overhead receiver, and a thermocouple. The reaction mixture was heated to about 450° F. with constant agitation. The reaction mixtures were held at 450° F. for no less than 2 hours. The pot was then cooled down to 200° F. and charged with 498 grams of 70 percent sorbitol, 610 grams of 80 percent corpent (byproduct of manufacturing pentaerythritol) and 694 grams of corn oil. The reaction mixture was heated to about 460° F. with constant circulation and vacuum pressure at 150 mm Hg. At about 450° F., 4 grams of Tyzor TE™ were added to the reaction mixture and continued the reactive distillation process until the theoretical amount water and ethylene glycol were distilled from the reaction mixture. The theoretical hydroxyl number was 253.

The resulting polyester polyol was characterized by determining hydroxyl number, acid number, viscosity, and pentane solubility. The polyol produced according to the above method had the following properties.

| | |
|---|---|
| Hydroxyl number | 247 |
| Acid number | 1.4 |
| Viscosity at 77° F. | >80,000 cps |

The hydroxyl numbers of this were raised up to 300 by adding diethylene glycol at 140° F. The viscosity and solubility of polyol were characterized as follows.

| | |
|---|---|
| Viscosity at 77° F. | 15,900 cps |
| Cyclo pentane solubility | 28.6 percent |

Example 12-A

A pilot scale of this reaction was conducted in the 1,000 gallon reactor. 543 pounds of diethylene glycol, 920 pounds of terephthalic acid, 259 pounds of 70 percent sorbitol, 318 pounds of 80 percent corpent, and 361 pounds of corn oil were added to pilot reactor that were equipped a circulation pump, reflux condenser, separation column, overhead receiver, and a thermocouple.

The reaction mixture was heated to about 480° F. with constant circulation and vacuum pressure at 250 mm Hg. At about 450° F., we added 8 pounds of Tyzor TE™ to the reaction mixture and continued the reactive distillation process until the theoretical amount water was distilled from the reaction mixture.

The resulting polyester polyol was characterized by determining hydroxyl number, acid number, viscosity and pentane solubility. The polyol produced according to the above method had the following properties.

| | |
|---|---|
| Hydroxyl number | 220 |
| Acid number | 0.7 |
| Viscosity at 77° F. | 78,500 cps |

The hydroxyl numbers of this were raised up to 300 by adding diethylene glycol at 140° F. The viscosity and solubility of polyol were characterized as follows.

| | |
|---|---|
| Viscosity at 77° F. | 15,900 cps |
| Cyclo pentane solubility | 28.6 percent |

The results of the laboratory preparation of Example 12 were duplicated by this pilot run.

Comparative Example 13

1,478 grams of diethylene glycol, 219 grams of triethylene glycol, 180 grams of tetraethylene glycol and 2,193 grams of polyethylene terephthalate (PET) were added to a five liter glass pot that were equipped with an agitator, reflux condenser, separation column, overhead receiver, and a thermocouple. The reaction mixture was heated to about 450° F. with constant agitation. The reaction mixtures were held at 450° F. for no less than 2 hours. The pot was then cooled down to 200° F., and charged with 413 grams of 70 percent sorbitol and 407 grams of 80 percent corpent to the pot. The reaction mixture was heated to about 460° F. with constant circulation and vacuum pressure at 100 mm Hg. At about 450° F. we added 4 grams of Tyzor TE™ to the reaction mixture and continued the reactive distillation process until the theoretical amount water and ethylene glycol were distilled from the reaction mixture. The theoretical hydroxyl number was 320.

Researchers then characterized the resulting polyester polyol by determining hydroxyl number, acid number, viscosity and pentane solubility. The polyol produced according to the above method had the following properties.

| | |
|---|---|
| Hydroxyl number | 320 |
| Acid number | 0.80 |
| Viscosity at 77° F. | 73,600 cps |
| Cyclo pentane solubility | <5 percent |

Comparative Example 13-A

We charged 2,000 grams of finished polyol from Example 13 and 222 grams of corn oil and 2 gram of Tyzor TE™ to a 4-neck 3 liter pot that were equipped with an agitator, reflux condenser, and a thermocouple.

The reaction mixture was heated up to 480° F. with 400 mm Hg vacuum. The temperature of 480° F. was held for 4 hours. After cooling, the polyol has the following physical properties.

| | |
|---|---|
| Hydroxyl number | 268 |
| Viscosity at 77° F. | 28,480 cps |

The hydroxyl number of this polyol was raised up to 300 by adding diethylene glycol at 140° F. The viscosity and solubility of polyol were characterized as follows.

| | |
|---|---|
| Viscosity at 77° F. | 15,200 cps |
| Cyclo pentane solubility | 7.4 percent |

The percent corn oil in finish polyol was 9.4.

Comparative Example 13-B

We charged 1,080 grams of finished polyol from Example 13, 191 grams of corn oil, and 1 gram of Tyzor TE™ to a 4-neck 3 liter pot that was equipped with an agitator, reflux condenser, and a thermocouple. The reaction mixture was heated up to 480° F. with 400 mm Hg vacuum. The temperature of 480° F. was held for 4 hours. After cooling, the polyol of blend has the following physical properties.

| | |
|---|---|
| Hydroxyl number | 249 |
| Viscosity at 77° F. | 15,440 cps |

The hydroxyl number of this polyol was raised up to 300 by adding diethylene glycol at 140° F. The viscosity and solubility of polyol were observed as follows.

| | |
|---|---|
| Viscosity at 77° F. | 6,800 cps |
| Cyclo pentane solubility | 10.7 percent |

The percent corn oil in finish polyol was 14.7. This example shows that if you expose the polyester polyol to heat first, then react with corn oil in a two-step reaction, the resulting polyol does not have desirable cyclo pentane solubility.

Example 14

1881 grams of diethylene glycol, 479 grams of phthalic anhydride, 1343 grams of terephthalic acid, 215 grams of sorbitol, and 1097 grams of corn oil were added to a reactor equipped with agitation, reflux condenser, overhead receiver, and thermocouples.

The reaction mixture was heated to 480° F. and the vacuum set at 250 mm Hg. At about 450° F. we added 5 grams of Tyzor TE™ and continued the reactive distillation until the theoretical amount of water was removed. The theoretical OH NO of this polyol was 210.

The final OH NO of the polyol was 171 indicating that we lost some diethylene glycol. The viscosity at this stage was 8640 cps. The OH NO was then adjusted to 210 by adding diethylene glycol at 140° F. The finished polyol had the following characteristics.

| | |
|---|---|
| OH NO | 210 |
| Viscosity, cps | 5,040 |
| Cyclo pentane solubility | 50.0 percent |
| Percent corn oil in finished polyol | 23.35 |

The following is a summary of each of the experiments shown before as to percentage of each component for more clarity.

| Weight % | Ingredients |
|---|---|
| 41.87 | Diethylene Glycol |
| 34.02 | Phthalate/Terephthalate |
| 4.81 | Sorbitol |
| 19.31 | Corn Oil |

The physical properties and pentane solubility follow.

| | |
|---|---|
| Hydroxyl number | 209 |
| Viscosity at 25° C. | 4,720 cps |
| Percent normal pentane solubility | 13.8 |
| Percent iso pentane solubility | 9.1 |
| Percent cyclo pentane solubility | 11 |

With 19.31 percent corn oil in the finished polyol, the cyclo pentane solubility is 11 percent, which is not desirable for systems application.

Comparison of Examples

As described above, the polyol made in the pilot plant in Example 1-A did not have enough pentane solubility. However, while repeating Example 1-A in pilot reactor (Example 2), we experienced some diethylene glycol loss during the distillation. At the end of the ester reaction, the hydroxyl number was 161 and viscosity was 11,000 cps at 25° C. The hydroxyl number was then raised up to 202 by adding diethylene glycol back to the polyol at 140° F. After adjustment, the cyclo pentane solubility was 22.5 percent, with the same amount of corn oil (19.3 percent) in finished polyol.

To confirm the improvement of cyclo pentane solubility of polyol, we repeated Example 2 in the lab. In Example 3, we removed 213 grams of diethylene glycol from 4000 grams of finished polyol as described in Example 1-B. At the end of striping, the intermediate had hydroxyl number of 152 and viscosity of 14,240 cps at 25° C. The hydroxyl number was adjusted back to 197. The cyclo pentane solubility was up from 10.9 percent to 30.56 percent. This process created a aromatic polyester polyol containing higher molecular weight corn oil that had excellent cyclo pentane solubility in the lab and the pilot plant.

Soybean oil was examined next. Example 4 duplicated Example 1-B, and Example 5 duplicated Example 3, except that the examples used soybean oil.

Then, higher functional and higher hydroxyl number polyols were analyzed. The polyol used in Example 6 was a higher functional and higher hydroxyl number polyester polyol. It consisted of sorbitol and pentaerythritol. It also contained 19.64 percent corn oil. Its hydroxyl number was 262 and viscosity was 11,520 cps at 25° C. Its cyclo pentane solubility was 16 percent.

After removing some diethylene glycol from the polyol in the laboratory as described in Example 7, the hydroxyl number was reduced from 262 down to 141 and viscosity was now greater than 80,000 cps at 25° C. The hydroxyl number of intermediate was then adjusted back to 262. The viscosity was 20,400 cps at 25° C. and cyclo pentane solubility was 31 percent.

Cyclo pentane solubility can be increased to 100 percent by increasing the molecular weight of polyester polyol (without adding diethylene glycol). However, the cyclo pentane solubility maintained high levels even after the addition of diethylene glycol. Creating high molecular weight, oil-containing polyester polyol was the key to increasing the cyclo pentane solubility of the polyol.

Examples 7, 8, 9, 10, 11 and 12 show that by reducing the molar ratio of glycols (diethylene glycol, triethylene glycol and tetraethylene glycol) to dicarboxyl acid (terephthalic acid and phthalic anhydride), we were able to create some very high molecular weight oil containing polyester polyols with the aid of functionality enhancers, such as glycerin, sorbitol, and pentaerythritol. It was not unusual that viscosities of these intermediates were greater than 100,000 cps at 25° C. before diethylene dilution. After diethylene glycol adjustment, the finished polyols with hydroxyl number from 260 to 450 contained less than 21 percent corn oil and had cyclo pentane solubilities of greater than 25 percent. The tables in the examples had displayed the cyclo pentane solubilities, viscosities and hydroxyl numbers of different blends.

Examples 7, 8, 9, 10, 11 and 12 show that the combination of reagents as follows can be used to make high viscosity intermediates.

1. Diethylene glycol, mixed dicarboxyl acid (terephthalic acid and phthalic anhydride), sorbitol, and corn oil as in Example 1.
2. Diethylene glycol, mixed dicarboxyl acid (polyethylene terephthalate and phthalic anhydride), sorbitol, pentaerythritol, and corn oil as Example 6.
3. Diethylene glycol, mixed dicarboxyl acid (terephthalic acid and phthalic anhydride), sorbitol, glycerin, and corn oil as Example 8.
4. Diethylene glycol, mixed dicarboxyl acid (polyethylene terephthalate and phthalic anhydride), sorbitol, pentaerythritol, and corn oil as Example 9.
5. Diethylene glycol, dicarboxyl acid (polyethylene terephthalate), sorbitol, pentaerythritol, and corn oil as Example 12;
6. Diethylene glycol, dicarboxyl acid (polyethylene terephthalate), sorbitol, glycerin, and corn oil as Example 10;

If we created a high molecular weight polyester polyol without incorporating corn oil or soybean oil as described in Example 13, then finished polyol (intermediate reacted with corn oil) would not have a satisfactory cyclo pentane solubility.

Using the process described above for making aromatic polyester polyol, we are able to create a very high OH NO, high functional and high cyclo pentane soluble polyester polyol with less than 21 percent built in natural oil.

Also, for additional comparison purposes, several examples from U.S. Pat. No. 6,359,022 were prepared and compared to Examples 8 to 12. Samples were analyzed for aromatic acid content, hydroxyl number, viscosity, cyclopentane solubility, R1, R2, and R3. R1 is total OH NO from the glycol and functionality enhancers divided by the total saponification number from TERE* plus PAA* plus natural oils. TERE* is terepthalate content from PET or TPA and PAA* is phthalate content from PAA. R2 is OH NO from DEG divided by the total OH NO from functionality enhancers. R3 is saponification number of (PAA*+TERE*) divided by the saponification of natural oil. Thus, a low R1 ratio indicates that a higher molecular weight polyol is created. A low R2 ratio indicates that a higher branch polymer is created which also indicates a higher molecular weight. A higher R3 ratio is more desirable because natural oil is monofuctional and will act as a urethane reaction terminator. Hence, limiting oil content in the finish polyol to below 21 percent is needed. A higher ester content is also needed to meet customer demands for an aromatic polyester polyol content of at least 32 percent. Table 1 and 2 below list the composition and product properties of the examples from U.S. Pat. No. 6,359,022 and Examples 8 to 12 as described above.

TABLE 1

Composition and resulting product properties of Examples F, G, H, J, and K of U.S. Pat. No. 6,359,022.

| | Example F Mole % | Wt % | Example G Mole % | Wt % | Example H Mole % | Wt % | Example J Mole % | Wt % | Example K Mole % | Wt % |
|---|---|---|---|---|---|---|---|---|---|---|
| DEG | 39.03 | 23 | 48.79 | 30.77 | 47.28 | 28.55 | 34.05 | 16.18 | 70.531 | 44.07 |
| TMP | 15.25 | 11.38 | 12.81 | 10.23 | 14.29 | 10.93 | 26.65 | 16.03 | | |
| PAA* | 38.17 | 28.01 | 32.06 | 25.18 | 31.17 | 23.44 | 26.29 | 15.55 | 22.14 | 17.23 |
| Soybean | 7.55 | 37.62 | 6.34 | 33.83 | 7.26 | 37.08 | 13.01 | 52.25 | 7.33 | 38.7 |
| Total | 100 | 100.01 | 100 | 100.01 | 100 | 100 | 100 | 100.01 | 100.001 | 100 |
| Aromatic acid content | | 28.01 | | 25.18 | | 23.44 | | 15.55 | | |
| OH No. | | 148 | | 240 | | 240 | | 240 | | 320 |
| Viscosity | | | | 684 | | | | 656 | | 170 |
| R1 | | 1.25 | | 1.63 | | 1.63 | | 1.6 | | 2.12 |
| R2 | | 1.71 | | 2.54 | | 2.21 | | 0.85 | | |
| R3 | | 3.31 | | 3.22 | | 2.78 | | 1.32 | | 1.96 |

TABLE 2

Composition and resulting product properties of Examples 8 to 12.

| | Example 8 Initial Mole % | Wt % | After adjustment Mole % | Wt % | Example 9 Initial Mole % | Wt % | After adjustment Mole % | Wt % | Example 10 Initial Mole % | Wt % | After adjustment Mole % | Wt % |
|---|---|---|---|---|---|---|---|---|---|---|---|---|
| DEG | 32.46 | 23.28 | 41.75 | 31.6 | 42.74 | 29.83 | 49.63 | 35.95 | 30.94 | 22.02 | 40.59 | 30.11 |
| Glycerin | 17.88 | 11.13 | 15.42 | 9.99 | | | | | 18.73 | 11.57 | 16.11 | 10.37 |

TABLE 2-continued

Composition and resulting product properties of Examples 8 to 12.

| TERE* | 29.52 | 26.36 | 25.45 | 23.65 | 27.62 | 24.01 | 24.3 | 21.91 | 39.59 | 35.1 | 34.05 | 31.46 |
|---|---|---|---|---|---|---|---|---|---|---|---|---|
| PAA* | 9.83 | 8.78 | 8.48 | 7.88 | 10.62 | 9.23 | 9.34 | 8.42 | | | | |
| Corpent | | | | | 9.87 | 9.94 | 8.68 | 9.07 | | | | |
| Sorbitol | 6.65 | 8.19 | 5.73 | 7.35 | 5.75 | 6.9 | 5.06 | 6.3 | 6.95 | 8.5 | 5.98 | 7.62 |
| Corn oil | 3.67 | 22.26 | 3.17 | 19.97 | 3.41 | 20.09 | 3 | 18.34 | 3.79 | 22.8 | 3.26 | 20.43 |
| Total | 100.01 | 100 | 100 | 100.44 | 100.01 | 100 | 100.01 | 99.99 | 100 | 99.99 | 99.99 | 99.99 |
| Aromatic acid content | | 35.14 | | 31.53 | | 33.24 | | 30.33 | | 35.1 | | 31.46 |
| OH No. | | 252.2 | | 335 | | 225 | | 300 | | 251 | | 335 |
| Viscosity | | >80,000 | | 12,720 | | >80,000 | | 11840 | | >80,000 | | 15520 |
| C. Pentane solubility in % | | | 36.7 | | | | 34.2 | | | | | 37.5 |
| R1 | | 1.62 | | | | 1.58 | | | | 1.61 | | |
| R2 | | 0.81 | | | | 1.56 | | | | 0.74 | | |
| R3 | | 7.03 | | | | 7.35 | | | | 6.85 | | |

| | Example 11 Initial Mole % | Wt % | After adjustment Mole % | Wt % | Example 12 Initial Mole % | Wt % | After adjustment Mole % | Wt % |
|---|---|---|---|---|---|---|---|---|
| DEG | 24.03 | 17.9 | 38.54 | 30.17 | 37.33 | 26.22 | 42.45 | 30.56 |
| Glycerin | 26.72 | 17.27 | 21.62 | 14.69 | | | | |
| TERE* | 40.07 | 37.15 | 32.41 | 31.6 | 40.4 | 35.34 | 37.1 | 33.26 |
| PAA* | | | | | | | | |
| Corpent | | | | | 12.09 | 12.26 | 11.1 | 11.53 |
| Sorbitol | 6 | 7.68 | 4.86 | 6.53 | 7.25 | 8.75 | 6.66 | 8.24 |
| Corn oil | 3.18 | 20 | 2.57 | 17.01 | 2.94 | 17.43 | 2.7 | 16.4 |
| Total | 100 | 100 | 100 | 100 | 100.01 | 100 | 100.01 | 99.99 |
| Total (TERE + PAA)* | | 37.15 | | 31.6 | | 35.34 | | 33.26 |
| OH No. | | 284 | | 400 | | 220 | | 300 |
| Viscosity | | >80,000 | | 17,400 | | >80,000 | | 15,900 |
| C. Pentane solubility in % | | | | 38.27 | | | | 28.6 |
| R1 | | 1.7 | | | | 1.56 | | |
| R2 | | 0.47 | | | | 1.14 | | |
| R3 | | 8.26 | | | | 9.01 | | |

These results show that the process and composition illustrated by Examples 8 to 12 require low oil content and provide high cyclo pentane solubility compared to the process and composition of Examples F-K of U.S. Pat. No. 6,359,022. The processes of Example 8 to 12 include a one step heating of the oil to about 250° C. while the '022 patent process uses a two step reaction. Also, Example 8 to 12 compositions with low oil content feature highly functional esters. This is a desirable feature because end product users can increase loading without sacrificing foam physical properties. Examples 8 to 12 also have higher aromatic acid content than the '022 patent. High aromatic acid content polyester polyols are used to form clear resin-side solutions. The high functionality resin-side solutions also have high loading which minimizes cost without sacrificing resulting foam physical properties. The physical properties of the resulting foams meet the commercial standards for spray-applied roofing even at lower than normal density and fire resistance properties of the foams meet the requirements for both PIP and Spray systems. Higher aromatic acid content is desirable because the final product foams have improved flame resistance.

All of the compositions or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the scope of the invention.

What is claimed is:

1. A method for manufacturing an aromatic polyester polyol, comprising:
   heating a glycol, a dicarboxylic acid or ester, functionality enhancing agent, and a natural oil to about 460° F.—about 480° F. to form a reaction product;
   allowing the reaction product to cool to about 140° F.; and
   adding additional glycol to form an aromatic polyester polyol composition, wherein the total glycol comprises less than about 36 weight percent of the polyol composition,
   wherein the natural oil comprises less than about 25 weight percent of the polyol composition and wherein the aromatic polyester polyol has a cyclopentane solubility of greater than 25%.

2. The method of claim 1, wherein the dicarboxylic acid or ester comprises more than about 29 weight percent of the polyol composition.

3. The method of claim 1, wherein the glycol is diethylene glycol, triethylene glycol, tetraethylene glycol, or combinations thereof.

4. The method of claim 1, wherein the dicarboxylic acid or ester is terephthalic acid, phthalic anhydride, polyethylene terephthalate (PET), a byproduct of aromatic carboxylic acid (BACA) or combinations thereof.

5. The method of claim 1, wherein the functionality enhancing agent is sorbitol, pentaerythritol, corpent, glycerin, or combinations thereof.

6. The method of claim 1, wherein the natural oil is corn oil, soybean oil, or combinations thereof.

7. An aromatic polyester-polyol composition, comprising:
    an aromatic polyester polyol reaction product formed by the method of claim 1.

8. The composition of claim 7, wherein the aromatic polyester polyol has a hydroxyl number of at least about 150.

9. The composition of claim 7, further comprising an aromatic acid content of about 30 to about 40 weight percent.

10. The composition of claim 7 further comprising a hydrocarbon blowing agent having a concentration of about 25 percent of the polyol composition.

11. The composition of claim 10, wherein the hydrocarbon blowing agent is pentane, cyclopentane, isopentane, or a combination thereof.

12. The method of claim 1, wherein the concentration of the natural oil is from about 16 to about 23 weight percent of the polyol composition.

13. A method for manufacturing an aromatic polyester polyol, comprising:
    heating a glycol, a dicarboxylic acid or ester, functionality enhancing agent, and a natural oil to about 460° F.—about 480° F. to form a reaction product;
    allowing the reaction product to cool to about 140° F.; and
    adding additional glycol to form an aromatic polyester polyol composition having a hydroxyl number of at least about 150.

14. The method of claim 13 wherein the aromatic polyester polyol composition has a cyclopentane solubility of greater than 25%.

15. The method of claim 13, wherein the natural oil comprises between about 16 wt. % to about 25 wt. % of the aromatic polyester polyol composition.

16. The method of claim 13, wherein the glycol comprises less than about 36 wt. % of the aromatic polyester polyol composition.

17. An aromatic polyester-polyol composition, comprising:
    an aromatic polyester polyol reaction product formed by the method of claim 13.

18. The composition of claim 17, wherein the aromatic polyester polyol reaction product has a cyclopentane solubility of greater than about 25%.

19. The composition of claim 17, wherein the natural oil comprises between about 16 wt. % to about 25 wt. % of the aromatic polyester polyol reaction product.

20. The composition of claim 17, wherein the glycol comprises less than about 36 wt. % of the aromatic polyester polyol reaction product.

* * * * *